US010694038B2

(12) United States Patent
Abraham et al.

(10) Patent No.: US 10,694,038 B2
(45) Date of Patent: Jun. 23, 2020

(54) SYSTEM AND METHOD FOR MANAGING CALLS OF AN AUTOMATED CALL MANAGEMENT SYSTEM

(71) Applicant: Replicant Solutions, Inc., San Francisco, CA (US)

(72) Inventors: Jack Phillip Abraham, San Francisco, CA (US); Benjamin Gleitzman, Alameda, CA (US)

(73) Assignee: Replicant Solutions, Inc., San Francisco, CA (US)

( * ) Notice: Subject to any disclaimer, the term of this patent is extended or adjusted under 35 U.S.C. 154(b) by 0 days.

(21) Appl. No.: 16/016,453

(22) Filed: Jun. 22, 2018

(65) Prior Publication Data
US 2018/0376002 A1   Dec. 27, 2018

Related U.S. Application Data

(60) Provisional application No. 62/545,418, filed on Aug. 14, 2017, provisional application No. 62/524,103, filed on Jun. 23, 2017.

(51) Int. Cl.
*H04M 3/51* (2006.01)
*H04M 3/22* (2006.01)
(Continued)

(52) U.S. Cl.
CPC ......... *H04M 3/5183* (2013.01); *G10L 13/043* (2013.01); *H04M 3/2218* (2013.01);
(Continued)

(58) Field of Classification Search
CPC ............. H04M 3/5183; H04M 3/2218; H04M 3/5166; H04M 2203/306; H04M 3/5235;
(Continued)

(56) References Cited

U.S. PATENT DOCUMENTS 9,542,657 B2 *   1/2017  O'Connor et al. ..... G06Q 10/00
2004/0085259 A1 *  5/2004  Tarlton .............. H04M 1/72544
                                                     345/2.3
(Continued)

FOREIGN PATENT DOCUMENTS

WO    2018237399 A1   12/2018

OTHER PUBLICATIONS

Li et al., "A persona-based neural conversation model", ACM Trans. Program. Lang. Syst., 1(5), 2016, 10 pgs.
(Continued)

*Primary Examiner* — Akelaw Teshale
(74) *Attorney, Agent, or Firm* — KPPB LLP

(57) ABSTRACT

Systems and methods for managing a call between a contact, a conversation bot, and a human agent are disclosed. The method selects a conversation bot associated with a particular human agent from multiple conversation bots that are each associated with a different human agent. Each conversation bot can be a model trained using conversation data recorded during conversations conducted by the particular human agent with which it is associated. The method connects an audio call with a human contact, and generates audio during the call based upon a voice of the particular human agent. The method determines that a transition criterion is satisfied, and selects a selected human agent from amongst a plurality of available human agents. When the transition criterion is satisfied, the method enables a selected human agent to participate on the call, and continues the call between the selected human agent and the human contact.

20 Claims, 5 Drawing Sheets

(51) Int. Cl.
*G10L 13/04* (2013.01)
*H04M 3/42* (2006.01)
*H04M 3/523* (2006.01)
*G10L 13/00* (2006.01)

(52) U.S. Cl.
CPC ........... *H04M 3/5166* (2013.01); *G10L 13/00* (2013.01); *H04M 3/42221* (2013.01); *H04M 3/5235* (2013.01); *H04M 2201/39* (2013.01); *H04M 2201/40* (2013.01); *H04M 2203/306* (2013.01)

(58) Field of Classification Search
CPC ......... H04M 2201/39; H04M 2201/40; H04M 3/42221; H04M 2242/18; G10L 13/043; G10L 13/00; G10L 15/22; G10L 17/26; G10L 2015/227; G10L 2015/223; G10L 15/26
See application file for complete search history.

(56) References Cited

U.S. PATENT DOCUMENTS

| | | | |
|---|---|---|---|
| 2005/0080628 A1* | 4/2005 | Kuperstein | G10L 15/22 704/270.1 |
| 2005/0105712 A1* | 5/2005 | Williams | G10L 13/027 379/265.02 |
| 2008/0043986 A1* | 2/2008 | Darby | H04M 3/5322 379/265.09 |
| 2011/0150189 A1* | 6/2011 | Kulkarni | H04M 3/323 379/32.01 |
| 2012/0041903 A1* | 2/2012 | Beilby | G06N 3/004 706/11 |
| 2012/0215577 A1* | 8/2012 | D'Arcy et al. | G06Q 10/10 705/7.14 |
| 2013/0257877 A1* | 10/2013 | Davis | A63F 13/12 345/473 |
| 2015/0142704 A1* | 5/2015 | London | G06N 5/022 706/11 |
| 2015/0195406 A1* | 7/2015 | Dwyer | G06F 21/6254 379/265.07 |
| 2017/0324868 A1* | 11/2017 | Tamblyn | H04M 3/5191 |

OTHER PUBLICATIONS

Li et al., "Deep Reinforcement Learning for Dialogue Generation", arXiv preprint arXiv: 1606.01541, 11 pgs.

Serban et al., "Building End-To-End Dialogue Systems Using Generative Hierarchical Neural Network Models", Proceedings of the Thirtieth MAI Conference on Artificial Intelligence (AAAI'16). AAAI Press, 8 pgs.

You et al., "Robust Image Sentiment Analysis Using Progressively Trained and Domain Transferred Deep Networks", Proceedings of the Twenty-Ninth AAAI Conference on Artificial Intelligence, pp. 381-388.

You et al., "Visual Sentiment Analysis by Attending on Local Image Regions", Proceedings of the Thirty-First AAAI Conference on Artificial Intelligence (AAAI-17), pp. 231-237.

International Preliminary Report on Patentability for International Application PCT/US2018/039363, Report issued Dec. 24, 2019, dated Jan. 2, 2020, 9 pgs.

International Search Report and Written Opinion for International Application No. PCT/US2018/039363, Search completed Aug. 30, 2018, dated Oct. 2, 2018, 16 pgs.

* cited by examiner

SYSTEM AND METHOD FOR MANAGING CALLS OF AN AUTOMATED CALL MANAGEMENT SYSTEM

CROSS-REFERENCE TO RELATED APPLICATIONS

The present invention claims priority to U.S. Provisional Patent Application Ser. No. 62/545,418, filed Aug. 14, 2017 and U.S. Provisional Patent Application Ser. No. 62/524,103, filed Jun. 23, 2017. The disclosures of U.S. Provisional Patent Applications Ser. Nos. 62/545,418 and 62/524,103 are herein incorporated by reference in their entirety.

FIELD OF THE INVENTION

The present invention relates generally to automated call management systems, and more specifically to managing calls between such systems and a human agent.

BACKGROUND

Interactive voice response (IVR) systems are often used to automate conversations with people, such as customers, potential clients, constituents, etc. IVR systems are often used at call centers to reduce the requirements for human agents who need to handle the calls. For example, many call centers use an IVR system for customer service roles to make an initial attempt to quickly address customer concerns without speaking to a human agent at all, or to gather information before speaking with a human agent.

SUMMARY OF THE INVENTION

Systems and methods for managing calls of an automated call management system in accordance with embodiments of the invention are illustrated. One embodiment includes a method for managing a call between a contact, a conversation bot, and a human agent, by selecting a conversation bot associated with a particular human agent from a plurality of conversation bots that are each associated with a different human agent using an automated call management system, wherein each conversation bot is a computer model trained using conversation data including specific conversation data recorded during conversations conducted by the particular human agent with which it is associated, connecting an audio call with a human contact using the automated call management system, generating audio during the call, where the audio is generated based upon a voice of the particular human agent using the automated call management system, recording speech of the human contact and converting the recorded speech to text to create a text transcript of the call using the automated call management system, determining that a transition criterion is satisfied based upon the text transcript of the call, selecting a selected human agent from amongst a plurality of available human agents using the automated call management system, when the transition criterion is satisfied, enabling a selected human agent to participate on the call using the automated call management system, and continuing the call between the selected human agent and the human contact.

In another embodiment, the selected human agent is the specific human agent associated with the conversation bot.

In a further embodiment, the selected human agent is a different human agent to the specific human agent associated with the conversation bot.

In still another embodiment, the method further comprises displaying a set of supplemental data to the selected human agent via a display, wherein the supplemental data comprises information gathered during the call.

In a still further embodiment, the supplemental data further comprises at least a portion of the text transcript.

In yet another embodiment, determining that a transition criterion is satisfied comprises determining whether a conversation is likely to enter a conversation loop.

In a yet further embodiment, determining that a transition criterion is satisfied comprises calculating a level of interest and transitioning the call to the handoff agent when the level of interest exceeds a threshold level.

In another additional embodiment, selecting the conversation bot comprises selecting the conversation bot based on at least one characteristic of the contact to be called.

In a further additional embodiment, connecting a selected human agent into the call further comprises generating a transitional conversation portion using the conversation bot and generating audio of the transitional conversation portion based upon the voice of the particular human agent.

In another embodiment again, enabling a selected human agent to participate on the call when a transition criterion is satisfied further comprises connecting the selected human agent into the call while audio is generated at the direction of the conversation bot speaks as it converses with the human contact, wherein the transition criterion is satisfied when the selected human agent provides an input to the automated call management system to enable the selected human agent to participate on the call.

In a further embodiment again, audio is generated based upon a voice of the particular human agent using at least one technique selected from the group consisting of playing back an audio recording of the particular human agent associated with the conversation bot, and synthesizing speech using a speech model based upon the voice of the particular human agent.

In still yet another embodiment, the method includes recording the outcome of the call and retraining the conversation bots based upon recorded call outcomes.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DISCLOSURE OF THE INVENTION

Turning now to the drawings, systems and methods for managing calls using an automated call management system in accordance with various embodiments of the invention are disclosed. In several embodiments, the automated call management system initiates calls and uses a personalized conversation robot or "personalized conversation bot" to conduct conversations using audio recordings of a specific human agent or speech synthesized based upon a speech model for a human agent. During the conversation, the personalized conversation bot can connect the human agent whose voice recording/synthesized speech was being used to conduct the conversation into the telephone call. In a number of embodiments, the automated call management system can connect a different human agent based upon factors such as (but not limited to) the availability of the human agent whose voice recording/synthesized speech was utilized by the bot and/or the human agent mostly likely to meet the objectives of the call. Automated call management systems, personalized conversation bots, and methods of transitioning conversations between personalized conversation bots in accordance with various embodiments of the invention are discussed further below.

Systems for Managing Calls of an Automated Call Management System

There are often many challenges in managing calls with an automated call management system. Automated call management systems are used to refer to all manner of systems for automatically handling verbal conversations with people, including (but not limited to) interactive voice response (IVR) systems for handling calls, digital personal assistants, and other systems for communicating with human persons. In many situations, an organization needs to make calls to many of its constituents, or contacts, such as (but not limited to) customers, potential clients, and organization members. Human agents of the organization often handle calls with the contacts for various reasons, such as, for example, to provide support services, to notify them of new opportunities, and to share information. However, for various reasons, a human agent is often unable to make efficient use of his or her time speaking with contacts. In addition, conversations can become frustrating as continuity is lost or as people just dislike speaking to automated systems.

Figure 1:
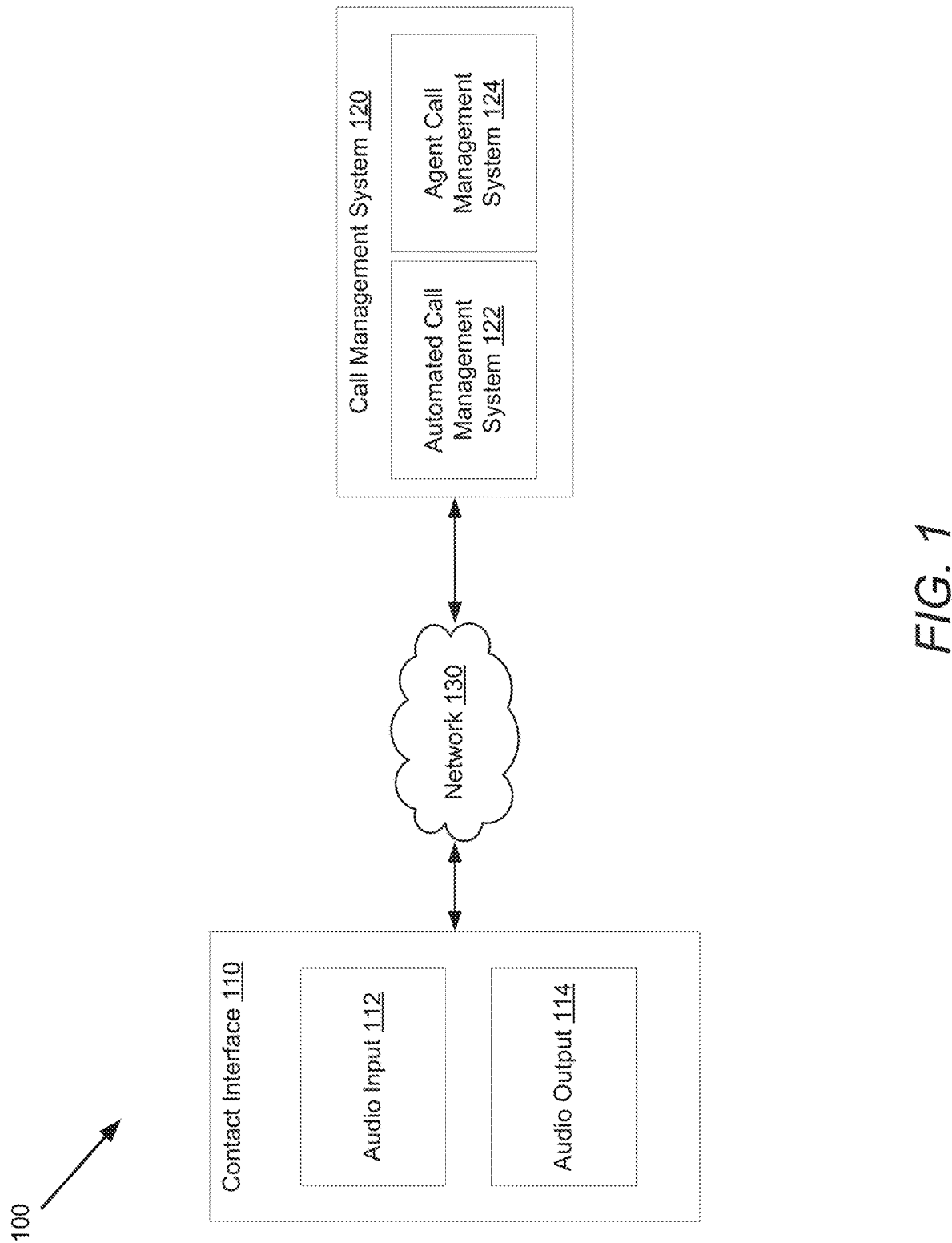
FIG. 1 illustrates a network in accordance with some embodiments of the invention.

Turning now to FIG. 1, a network diagram in accordance with an embodiment of the invention is illustrated. Network 100 includes a contact interface 110 that communicates with a call management system 120 via a network 130. Contact interface 110 can include an audio input 112 for receiving audio input, such as (but not limited to) a microphone, and an audio output 114 for producing audio outputs, such as (but not limited to) an audio speaker. Audio input 112 of several embodiments is for receiving audio from a person, or human contact, that can interact with the call management system 120. The audio output 114 can be for providing audio generated by a personalized conversation bot and/or a human agent via the call management system 120. The contact interface 110 can be provided by any of a variety of devices, such as (but not limited to) a telephone, an avatar in a virtual space, and a physical automaton in a physical space.

In many embodiments, the contact interface 110 allows a contact to take part in a conversation through a call management system 120. The call management system 120 includes an automated call management system 122 and/or an agent call management system 124. The automated call management system 122 can provide automated conversations with the contacts and/or support for conversations with human agents. An agent call management system 124 in accordance with a number of embodiments of the invention can be a call routing system for directing calls with human contacts to various human agents.

In many embodiments, automated call management system 122 handles the initial portion of a conversation with a contact and transitions the conversation to the agent call management system 124 based on various factors, including (but not limited to) a level of interest shown by the contact, an inability to answer a question posed by the contact, and/or availability of the human agent. Alternatively, or conjunctively, the interactions between automated call management system 122 and agent call management system 124 are more fluid, with the conversation moving back and forth between the systems, or with automated call management system 122 providing conversation support to the human agent, such as (but not limited to) a script, suggested topics for conversation, and/or an interactive multi-party conversation between the human agent, the conversation bot, and the contact. In some embodiments, the automated call management system 122 provides conversation support by allowing the human agent to transfer the call back to a conversation bot to perform various functions to conclude a call, such as (but not limited to) collecting payment information, scheduling an appointment, and modifying service levels for the contact. Additional examples of automated call management systems according to various embodiments of the invention are described with reference to FIG. 2.

Network 130 can be, but is not limited to, the Internet, a local area network, a wireless local area network, wide area network, a software defined network, and/or any other type or combination of types of network as appropriate to the requirements of a given application. Although the example of FIG. 1 shows a single network 130, multiple networks may be used for communications between various elements of the system. For example, in some embodiments, contact interface 110 communicates with call management system 120 through a first network and the automated call management system 122 communicates with the agent call management system 124 through a different second network. Network communications may also include communications with other elements, such as (but not limited to) an external speech processing engine, and an enterprise database system.

While specific network configurations have been described above, one of ordinary skill in the art can appreciate that any configuration or devices could be used as appropriate to the requirements of specific applications. Methods for managing conversations between contacts and human agents are described below.

Figure 2:
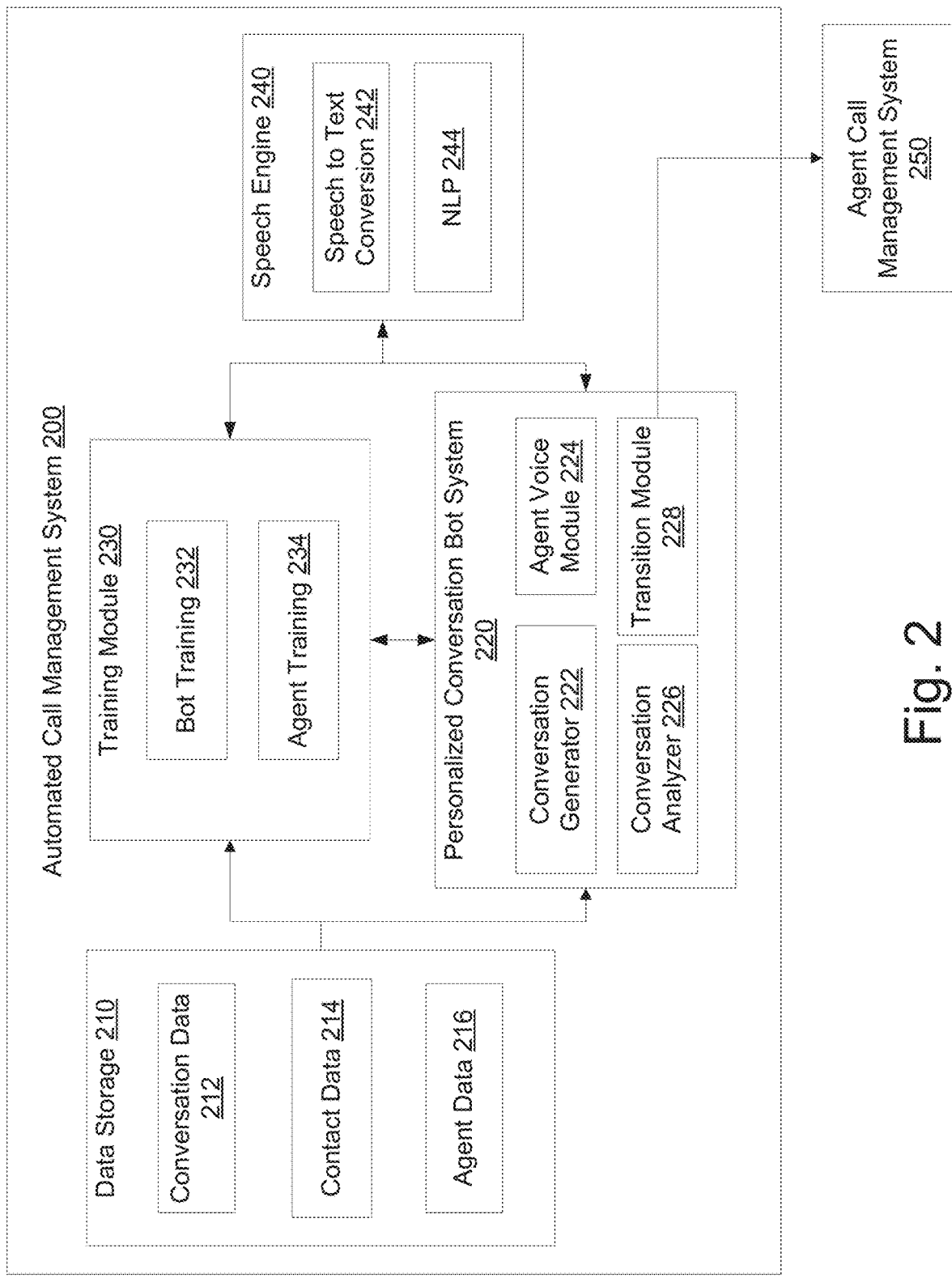
FIG. 2 is a system diagram illustrating an automated call management system for managing conversations between an automated call management system and a human agent.

Automated call management systems in accordance with many embodiments of the invention can be used to train personalized conversation bots to conduct a natural and personal conversation with a contact using voice recordings and/or synthesized speech of a human agent and to make a seamless transition of the conversation to that human agent or another human agent as the situation may demand. An example of a call management system 200 for conversation management according to an embodiment of the invention is illustrated in FIG. 2. In various embodiments of the invention, a call management system is utilized that trains personalized conversation bots to handle a call and uses the trained bots to manage conversations with contacts before transitioning the conversations to the human agents to which the conversation bots are personalized.

The exemplary automated call management system 200 of FIG. 2 includes data storage 210, a personalized conversation bot system 220 that can conduct at least one conversation personalized to the voice of a particular human agent, training module 230, and speech engine 240. Automated call management system 200 communicates with agent call management system 250. Agent call management system 250 of many embodiments is a system that routes phone calls to human agents, such as (but not limited to) callers in a call center, sales representatives, campaign call staff, and/or customer support representatives.

Data storage 210 includes various sources of data that are used for the training and execution of conversation bots, as well as for the analysis of conversations handled by the conversation bots. In this example, data storage 210 includes conversation data 212, contact data 214, and agent audio data 216. Conversation data in several embodiments includes records (e.g., audio recordings, transcripts, summaries, etc.) of conversations handled by human agents and/or bots. In many embodiments, conversation data includes metadata related to the conversations such as (but not limited to) call outcomes, sentiment (or mood) data, keywords, issues, and/or metrics of a personalized conversation bot's performance within the conversation. For example, in some embodiments, a personalized conversation bot's performance for a conversation is measured based on one or more of a variety of factors including (but not limited to) a duration of the call, key word frequency information, detected sentiment, a measured level of interest of a contact after the bot's performance, sales lead qualification, and/or whether the personalized conversation bot needed to transition to a human agent at all.

In several embodiments, contact data 214 can include a variety of information that is gathered about the contacts that the automated call management system communicates with. In certain embodiments, the contact data 214 includes a variety of information collected about the contact, such as (but not limited to) purchase history, previous call history with the organization, personal information, location information, and payment information. The contact data in accordance with some embodiments of the invention is collected from a variety of sources including, but not limited to, social media, public databases, and internal customer relationship management (CRM) systems. In many embodiments, the system 200 also collects and stores new information about the contact based on responses of the contact during conversations with the personalized conversation bot and/or to the human agent.

In some embodiments, data storage 210 includes agent data 216, which includes various data about the human agent and/or the human agent's performance, such as (but not limited to) "success" metrics (e.g., close rate, customer satisfaction ratings, closed deal value, etc.), availability, subject matter expertise (e.g., regarding products, features, markets, competitors, etc.), and schedule. In certain embodiments, the agent data 216 includes conversation data for each human agent. The conversation data may include information regarding the way that the human agent speaks, including (but not limited to) the pace at which the agent speaks, mannerisms, accents, jargon, tone, and pitch. The agent data 216 can be used to assign contacts to human agents and/or to provide support (e.g., a script and/or suggested topics) that is personalized for a specific human agent when transitioning a call to the human agent.

While specific types and sources of data are described herein, it should be appreciated that the automated call management systems may incorporate many other types of data as appropriate to the requirements of a given application in accordance with various embodiments of the invention.

The example system shown in FIG. 2 illustrates a training module 230 that can use the various data of data storage 210 to generate personalized conversation bots in accordance with various embodiments of the invention. Training module 230 includes a bot training module 232 and an agent training module 234. Bot training module 232 of many embodiments collects training information from the various data sources of data storage 210, such as (but not limited to) historic conversations collected from conversation data 212 and information about human agents from agent data 216. In many embodiments, the bot training module 232 is continually updated with new information as the human agents and/or personalized conversation bots conduct new conversations with various contacts.

The bot training module 232 of several embodiments uses recordings of conversations between the human agents, conversation bots, and/or contacts, in conjunction with other information that is collected about the human agents and/or contacts, in order to train the conversation bots. In many embodiments, bot training module 232 analyzes various audio characteristics of a human agent and their conversations, including (but not limited to) tempo, tone, mood, and pronunciation, in order to train the conversation model and/or speech patterns of a conversation bot. In some embodiments, in addition to audio characteristics of the conversation recordings, bot training module 232 also analyzes the meaning and intent of the various questions and responses of the conversations to train the conversation bots.

In many embodiments, speech engine 240 is used to convert recorded audio to textual speech that can be analyzed for meaning. Speech engine 240 can include a speech to text conversion module 242 and a natural language processing module 244. In some embodiments, speech engine 240 is external to the system and uses a set of third party services, such as cloud services, that convert audio to text and/or perform the various NLP methods to analyze the converted text to provide additional information including (but not limited to) semantic metadata. In various embodiments, speech engine 240 stores the resulting parsed text and/or additional semantic metadata to data storage 210. In certain embodiments, bots can be trained based on the audio characteristics of recordings of a first human agent and trained based on the content of recordings of a second human agent. This can allow a bot to improve the content of its conversations separately from the accuracy of matching the voice of a human agent.

Some embodiments of training module 230 also interact directly with the human agent to capture new data that can be used for the training and use of personalized conversation bots through agent training module 234. In many embodiments, recordings of a human agent's conversations are recorded and used in other calls with other contacts. In some such embodiments, agent training module 234 can be used to capture new audio to create additional responses and statements that can be used to increase the flexibility and range of the conversation bots. For example, the audio data can be used to simulate conversations with a human agent, based on an analysis of other conversations of other human agents, in order to collect additional agent audio data that can be used by the conversation bot to converse with contacts in a natural manner and in the human agent's voice. In some embodiments, the simulated conversations are generated based on one or more of a variety of factors, including the frequency of particular questions, previous failures by a bot to maintain a conversation with contacts, and/or the release or availability of new products and/or services.

In certain embodiments, the automated call management system operates within a distributed cluster of computers, training and generating personalized conversation bots to place calls for one or more call centers to contacts in various geographical regions. When multiple instances of a personalized conversation bot are operated for a single human agent, the automated call management system of certain embodiments can determine the number of personalized conversation bots with which to conduct calls on behalf of each particular human agent. The multiple conversation bots can then make calls concurrently (e.g., in parallel or with varying offsets). The number of personalized conversation bots for a particular human agent in accordance with many embodiments of the invention is based on a predicted availability of the human agent, which can be calculated based on a statistical analysis of the human agent's calls, schedule, availability, and/or an expected rate of successfully reaching a transition point for transitioning a conversation to the human agent. In a number of embodiments, predictions can be based upon data describing previous interactions with a particular contact maintained within a customer relationship management (CRM) system.

The use of multiple conversation bots for a single human agent is particularly useful in areas, such as (but not limited to) sales, debt collection, surveys, and other data collection, where the performance of the human agent is important. In such contexts, the ability to use multiple bots provides several benefits both for the human agent and towards the goals of the organization. For example, the use of such conversation bots in a sales context can provide greater sales efficiency by using multiple bots to qualify multiple leads, enabling a human agent to focus his or her time on only the most promising leads or candidates. By eliminating the need for the human agent to spend time with qualifying a sales lead, the human agent is able to ramp up throughput based upon spending more time interacting on calls with viable leads. The combination of these effects can enable a human agent to do more calls in a day with viable leads and/or to focus their time on calls with viable leads. This focused use of the human agent's time can enable greater sales efficiency and potentially increase revenue per sales person. The organization can also operate more efficiently, reducing overhead costs by allowing for fewer sales people for a given number of customers/leads.

The use of multiple conversation bots can also enable rapid improvement in the quality and effectiveness of calls made by conversation bots. For instance, the system according to many embodiments trains multiple similar bots, which can be used to A/B test multiple versions of the conversation bot, including (but not limited to) variations in phrases used in conversation, a tone or accent of the conversation bot's voice, and/or sales approaches. In some embodiments, results of A/B testing can be used to train and update a conversation bot. The use of conversation bots allows for rapid iterations through many versions of the conversations and for strict control of the variations between the calls. The feedback from such tests can not only be used to train the conversation bots to provide better service, but can also be used to train the human agents as they are able to see the effects of small changes in what they say and/or how they speak. In many embodiments, the training of the conversation bots is evaluated based upon the effectiveness of the conversation bots in qualifying leads at the point in time at which a conversation is handed off to a human agent. In a number of embodiments, the conversation bot is trained to optimize the combined performance of the conversation bot and one or more human agents. As can readily be appreciated, any of a variety of optimization criterion can be utilized in the training of conversation bots as appropriate to the requirements of a given application.

Referring back to FIG. 2, automated call management system 200 of several embodiments includes a personalized conversation bot system 220 that uses the trained personalized conversation bots to handle conversations with contacts prior to handing the conversations off to a human agent, or upon taking over a transferred conversation from the human agent. In the illustrated embodiment, personalized conversation bot system 220 includes conversation generator 222, agent voice module 224, conversation analyzer 226, and transition module 228.

In many embodiments, conversation generator 222 uses a personalized conversation bot trained by training module 230 to generate conversations with contacts. In some such embodiments, conversation generator 222 utilizes a conversation model that generates responses to the contacts during a conversation to satisfy a contact's needs and/or to lead to a successful result, such as (but not limited to) a sale, qualification of a sales lead, a commitment to vote, and/or a positive review of provided services. The conversation generator 222 can process audio data that is recorded on a call to identify an appropriate response, such as (but not limited to) answers to posed questions, follow up questions, and informational descriptions of services and products. As noted above, many embodiments of the invention utilize a conversation generator that is a mixed initiative model to accommodate the conversation being lead at various points in the conversation by the personalized conversation bot and/or the human contact. The conversation generator 222 can generate conversations based on a conversation model that provides responses based on communications with the contact.

Personalized conversation bot system 220 of many embodiments uses agent voice module 224 to select a human agent voice to use in conjunction with the conversation generator 222. Agent voice module 224 of some embodiments includes voice recordings of the selected human agent, which can be used during conversations with contacts. The recordings of various embodiments are captured during conversations of the human agent with contacts and/or audio captured from the agent (such as through a simulated conversation with a bot or based on a script) while training the conversation bot.

Alternatively, or conjunctively, agent voice module 224 can synthesize the voice (and/or other methods of communication) of a particular human agent to mimic the style and/or speech patterns of the particular human agent. In certain embodiments, when the human agent's voice is synthesized, conversations generated by the personalized conversation bots can be customized to include contact-specific information to facilitate the conversation with the contact. In a number of embodiments, the personalized conversation bots are biased to select responses for which an audio recording exists in preference over generating synthetic speech using a speech synthesizer. As can readily be appreciated, the specific manner in which speech is generated is typically dependent upon the requirements of a given application.

In some embodiments, as personalized conversation bots conduct conversations with contacts, conversation analyzer 226 of the bot system 220 continuously monitors and analyzes the communications with the human contact. In some embodiments, conversation analyzer 226 analyzes communications between the human contact and the personalized conversation bot, as well as any conversations after it transitions to a human agent.

In many embodiments, the conversation analyzer 226 works in conjunction with the bot training module 232 of training module 230 to continuously update the personalized conversation bots in light of newly collected information. The training module 230 of several embodiments trains and optimizes the personalized conversation bots to be able to handle a greater portion of a conversation before transitioning to the human agent. For example, in some embodiments, a conversation is marked with certain milestones that indicate progress of the conversation and the conversation bots are trained to maximize the number of milestones that are reached prior to transitioning a call to a human agent. Examples of milestones can include (but are not limited to, the collection of personal data, identification of a desired product and/or service, identification of interest level, and confirmation of payment information. Alternatively, or conjunctively, the training module 230 trains the personalized conversation bots based on a "success" measurement for the call, such as (but not limited to) a measured level of interest, a contact's rating of the call, sales lead qualification, and a human agent's ability to successfully handle the call. The conversation analyzer 226 of several embodiments also works in conjunction with speech engine 240 to uncover meaning and/or mood from the audio of the conversation.

In many embodiments, as conversation analyzer 226 analyzes a conversation, transition module 228 performs a determination of whether to transition the conversation based on the analysis of the call. When transition module 228 determines to forward the call to a human agent, transition module 250 of some embodiments forwards the call to the agent call management system 250 to be routed to and handled by the handoff agent. In other embodiments, a human agent monitors at least a portion of the call and is able to initiate a transition of the call to the human agent. In many embodiments, the transition module 228 also provides supplemental data, such as (but not limited to) a script, suggested topics, and customer information, to the agent call management system 250, which provides the supplemental data to the handoff agent to facilitate the transitioned conversation.

Methods for Training Personalized Conversation Bots

Figure 3:
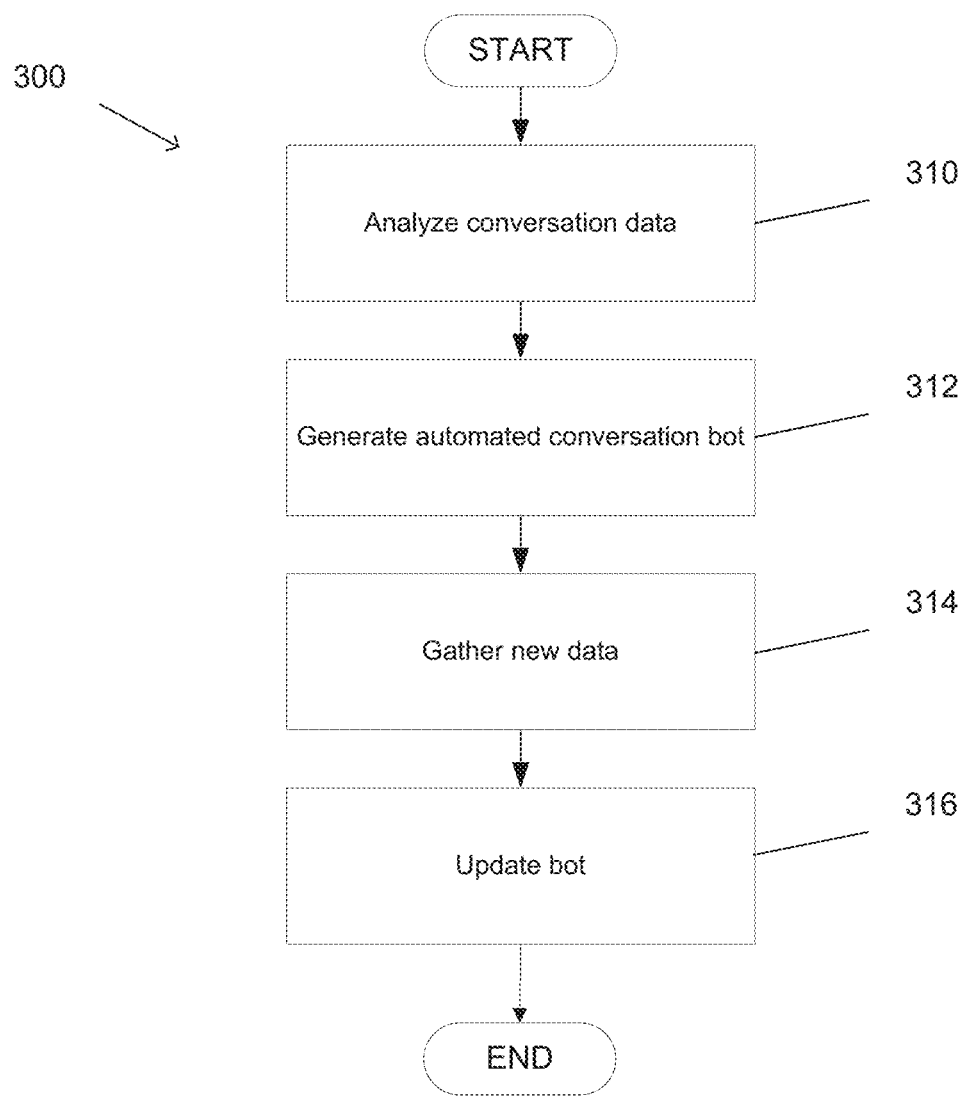
FIG. 3 is a flow chart illustrating a process for training conversation bots to handle conversations between an automated call management system and a human agent.

An exemplary process for training personalized conversation bots will now be described with reference to FIG. 3. The process 300 begins by analyzing (310) conversation data, such as that gathered during conversations between contacts, one or more human agents, and/or personalized conversation bots. In several embodiments, the process analyzes conversation data in the form of audio recordings of calls between contacts, human agents and/or bots by converting the speech to text and performing any of a variety of natural language processing (NLP) methods on the converted text to extract various information about the conversation, including (but not limited to) meaning, mood, sentiment, information about the contact, sales lead qualification, a level of interest (e.g., in a product, service, or candidate), intent, or a need to speak with a human agent directly. Sentiment analysis can employ any of a variety of methods including (but not limited to) polarity detection and sentiment classification using machine learning. In some embodiments, the analyzed conversation data is used to collect and report the extracted information. For example, in several embodiments, sales analytics data is collected from the conversation data, which can be used to develop sales strategies, inform marketing plans, and/or to track information about an ongoing relationship with a customer.

In many embodiments, the extracted information can be used with various methods of machine learning to train a conversation bot to maximize organization objectives, including (but not limited to) managing a contact's mood, optimizing interest levels, and reducing the amount of time required for speaking with a human agent. In several embodiments, the conversation bots are trained using any of a variety of techniques including (but not limited to) training of statistical classifiers, and/or deep learning (e.g. neural network) based classification techniques that may or may not use semantically labelled training data sets. Examples of approaches that can be utilized to train personalized conversation bots that imitate human-human conversations conducted between human agents and contacts include but are not limited to the approaches described in Iulian V. Serban, Alessandro Sordoni, Yoshua Bengio, Aaron Courville, and Joelle Pineau 2016. Building end-to-end dialogue systems using generative hierarchical neural network models. In Proceedings of the Thirtieth AAAI Conference on Artificial Intelligence (AAAI' 16). AAAI Press 3776-3783, the disclosure of which is hereby incorporated by reference in its entirety. As is discussed below, problems that can be encountered using such sequence-to-sequence learning approaches such as (but not limited to) conversation loops and/or generic responses can be handled in accordance with many embodiments of the invention by transitioning to a human agent. In a number of embodiments, a reinforcement based learning approach is utilized that incorporates reinforcing conversation goals during the training process to achieve a conversation bot that both mimics human-human dialogue and advances conversation objectives including (but not limited to) the processes described in Li, Jiwei, et al. "Deep reinforcement learning for dialogue generation." arXiv preprint arXiv:1606.01541 (2016), the disclosure of which is incorporated by reference in its entirety.

Referring again to FIG. 3, the process 300 generates (312) an automated conversation bot. An automated conversation bot of various embodiments is used to conduct at least a portion of a voice conversation with a contact. In many embodiments, the conversion bot trained by the system is a mixed initiative conversation bot (as opposed to a single initiative system in which the system controls the conversation). In this way, the conversation bot can mimic interactions that can occur in human conversations. In some embodiments, automated conversation bots are generated and personalized for each human agent of an organization, trained to use the voice of the human agent and/or the conversation bot is further trained or uses an initial training approach that considers the human agent's previous conversations with other contacts to personalize the conversation bot's style of conversation to more closely mimic that of a particular human agent. In certain embodiments, the process 300 analyzes the audio data directly to identify various audio characteristics of a human agent and their conversations, including (but not limited to) tempo, tone, mood, and pronunciation. In certain embodiments, the automated bots are generated based on the specific call data gathered from a particular human agent so that the automated bot can handle a call and provide responses in a manner specific to the particular human agent. In many embodiments, the personalized conversation bot can be trained based upon conversations with a particular human agent and a particular contact to attempt to mimic the conversational style of the human agent when conversing with the particular contact. In several embodiments of the invention, approaches for personalizing conversation bots are similar to those described in J. Li, M. Galley, C. Brockett, G. Spithourakis, J. Gao, and B.

Dolan. A persona-based neural conversation model. ACM Trans. Program. Lang. Syst., 1(5):994-1003, 2016, the disclosure from which including the relevant disclosure related to the personalization of conversation bots is hereby incorporated by reference in its entirety. As can readily be appreciated, any of a variety of approaches for the personalization of conversation bots can be utilized as appropriate to the requirements of a given application.

In many embodiments, conversation bots are also trained using conversation data of other human agents. For example, in certain embodiments, the conversation bot for a particular human agent is trained, not only to mimic the speech of the human agent, but also to improve the conversations and responses of the bot based on the success of other human agents of the organization. The process of some embodiments trains the conversation bots to build a conversation model that is able to generate responses to contacts during a conversation to satisfy a contact's needs and/or to lead to a successful result, such as (but not limited to) a sale, a commitment to vote, and a positive review of provided services. In a number of embodiments, the generative model is biased toward generation of conversational responses for which an actual audio recording of the response exists within a database of audio recordings for a particular human agent. In this way, the personalized conversation bot utilizes recorded speech to increase realism and only synthesizes speech (based upon a speech model for the particular human agent) in the absence of an appropriate audio recording. As can readily be appreciated, the particular manner in which speech is generated (e.g. based upon recordings or using speech synthesizers) is largely dependent upon the requirements of a given application.

Once the process generates personalized conversation bots for a set of human agents, the process 300 can continue to gather (314) new data and update (316) one or more generated bots based on the gathered data. In many embodiments, the steps of gathering data and updating the generated bots can be performed continuously as the associated human agents conduct more calls with contacts. In several embodiments, the personalized conversation bots can continue generating recommended responses during conversations involving the human agents that are displayed to the human agents. In this way, inexperienced human agents can gain the benefit of recommendations that are generated based upon a training corpus that includes conversations conducted by more experienced human agents. In this way, the personalized conversation bot can train the human agent using proposed responses that are generated in the style/voice of the human agent.

Methods for Managing Calls of an Automated Call Management System

Figure 4:
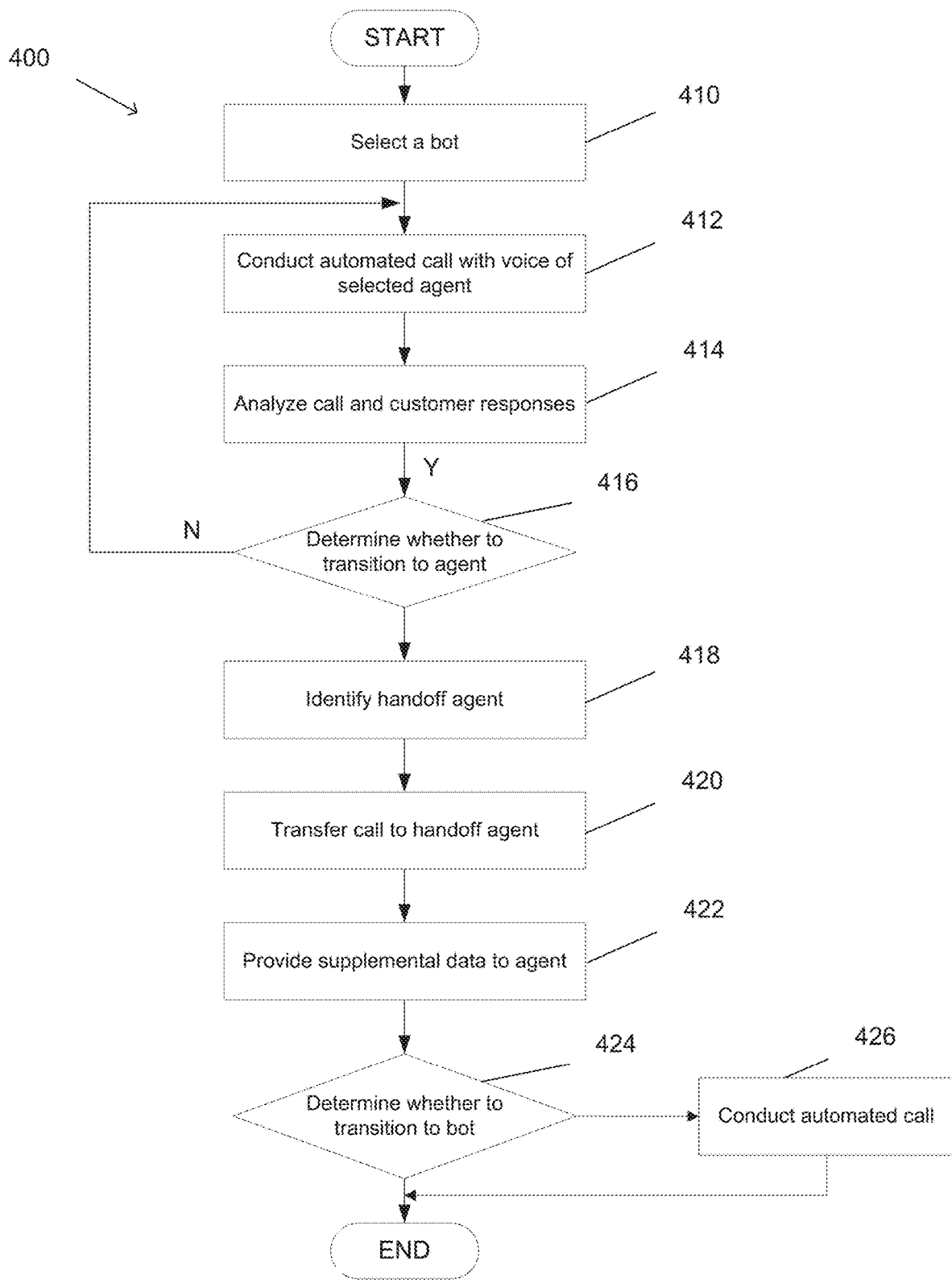
FIG. 4 is a flow chart illustrating a process for managing conversations through an automated conversation management system.

Once the conversation bots are trained, the bots can be used to communicate with contacts, handling inbound calls and initiating outbound calls. A process 400 for managing calls of an automated call management system in accordance with embodiments of the invention is conceptually illustrated in FIG. 4. The process 400 of many embodiments is performed when a new call is to be initiated with a contact, such as (but not limited to) a customer, a potential client, a constituent, or a member of an organization.

In certain embodiments, the process 400 begins by selecting (410) a personalized conversation bot for the conversation. The personalized conversation bots each can be trained based upon the conversation patterns of specific human agents and are used with the voice of the human agent to which they are related. For example, in some embodiments, the bots use recorded audio from the human agent to conduct the automated conversations. Alternatively, or conjunctively, the bots of certain embodiments synthesize audio for a particular human agent to mimic the style and/or speech patterns of the particular human agent.

In many embodiments, the bot is selected based on information about the contact, such as (but not limited to) the contact's demographics, previous history with the organization, location, and preferences. Alternatively, or conjunctively, each personalized conversation bot is associated with a human agent of the organization, and the personalized conversation bot for a conversation is selected based on one or more characteristics of the associated human agent, such as (but not limited to) performance on previous calls, relationships with the particular contact, and current availability (i.e., whether the human agent is currently engaged on a call).

In many embodiments, many different personalized conversation bots are operated to communicate with contacts. In some embodiments, a personalized conversation bot corresponding to a single human agent is operated in parallel on multiple processors and/or multiple machines making several simultaneous calls. In this manner, many initial calls can be made to identify a contact that is interested in interacting with the human agent, allowing the human agent to focus on handling the contact after the initial steps (e.g., collecting information, determining interest in a product or service, etc.) have been handled by the personalized conversation bots that are conducting the initial screening of the filters.

In several embodiments, the conversation bot is based on a specific person (e.g., a politician, celebrity, etc.), which several contacts may wish to interface with. For example, in the case of a political campaign environment, a conversation bot for a campaigning politician may be trained to conduct conversations with constituents, answering questions about policies and political positions in the voice and manner of the candidate. Such a conversation bot, in accordance with a number of embodiments of the invention, could be trained using recorded conversations of the politician with real constituents and/or in a recorded session with frequently asked questions that are collected during the campaign. In several embodiments, multiple conversation bots for a single candidate could be operated in parallel, allowing a candidate to interact with a far greater number of constituents than would otherwise be possible.

Referring back to the process 400, once the process has selected a bot and an associated human agent, the process 400 of some embodiments conducts (412) an automated call with the voice of the associated human agent. The process of certain embodiments uses recordings of the associated human agent to provide responses and/or to run through a script that is generated for the conversation. Alternatively, or conjunctively, the process synthesizes the voice and/or speaking style of the associated human agent to run through a generated conversation model.

In certain embodiments, the process also performs additional actions in support of the conversation with the contact. For example, the process according to several embodiments of the invention provides additional information to the contact through alternative channels of communication, such as (but not limited to) text messages, email, and social media messaging. The additional information in accordance with some embodiments of the invention includes (but is not limited to) one or more of scheduling requests based on times and/or places discussed during the conversation, reminders for action items discussed during the conversation, a summary of the conversation, follow up information requested during the conversation, map and/or navigation information for a location discussed during the conversation, and pricing information for a specific product and/or service.

Many of the examples described in this application are directed to verbal conversations between a contact and a human agent. In some embodiments, conducting the call includes a visual component, such as (but not limited to) a teleconference or other visual display of the agent represented by the conversation bot. In some such embodiments, the call may include non-verbal communication, such as (but not limited to) gestures, posture, and facial expressions to help to convey the mood and personality of the agent's conversation bot. The visual display of the agent in accordance with some embodiments of the invention is provided based on video recordings and/or synthesized video that is generated based on a script and a corpus of video recordings of the agent. Similarly, the process according to a number of embodiments of the invention analyzes video of the contact to interpret the contact's non-verbal communications and to incorporate the results of the analysis in training the conversation bot, conducting the conversation, and determining whether and to whom to transfer a conversation. Examples of processes for visual sentiment analysis include, but are not limited to the use of convolution neural networks (CNNs) on video and/or images to identify an emotional response of a contact. Examples of approaches that can be utilized for visual sentiment analysis include but are not limited to the approaches described in Visual Sentiment Analysis by Attending on Local Image Regions, by You, Quanzeng, et al.

During the call, the process of many embodiments continually analyzes (414) the ongoing conversations between personalized conversation bots, human contacts, and human agents. The analysis of the ongoing conversations allows the process to gather new information, such as (but not limited to) identifying a contact's mood, identifying related products and/or services to be presented to the contact, and determining a contact's level of interest. In some embodiments, the process analyzes the conversation to identify specific needs of the contact, such as (but not limited to) features of the product that are of particular interest, a competitor with whom the contact is familiar, a timeline of the contact (e.g., whether the contact wants to move quickly or is looking to deliberate over their decision), and particular use cases that may be particularly useful to the client.

In many embodiments, the gathered information is used to update a customer relationship management (CRM) system that tracks various information about current and potential customers for an organization. The process according to some embodiments automates the process of adding and updating customer information within the CRM system based on the information gathered from the conversation with the contact. The conversation may include portions handled by the conversation bot and/or portions handled by the human agent. In some embodiments, the information is automatically stored and updated in the CRM system. Alternatively, or conjunctively, the information is used to populate an entry for the contact in the CRM system, which is then reviewed and approved by the human agent (or by another human, such as, but not limited to, a manager and another agent) before being entered into the CRM system. In certain embodiments, the gathered information is used to validate a human agent's entries into the CRM system, identifying potential errors or clarifying entries into the CRM system, such as (but not limited to) areas of interest, scheduled dates and/or times, and other follow-up information.

The process in accordance with some such embodiments uses a conversation bot to interact directly with a human agent to gather and validate information prior to entering it into the CRM system. The process in accordance with some such embodiments conducts a conversation with the human agent, after the call with the contact, in order to review the conversation through a variety of actions including (but not limited to) confirming next steps, data that should be added to the CRM system, measuring a mood of the contact, and verifying a level of success for the call. For example, in a number of embodiments, a conversation bot prepares a script with a series of questions to confirm information gathered from the analyzed conversations or to collect additional information that the process was unable to decipher from the conversation.

In various embodiments, the analysis also allows the conversation bot to adjust the conversation based on the gathered information. The process in accordance with some embodiments adjusts the verbal and/or non-verbal communications of the conversation bot based on inputs received from the contact through various methods including (but not limited to) sentiment analysis of content and/or tone of the contact's voice, as well as visual analysis of the contact (including but not limited to gender, clothing, facial cues, and posture). In addition to adjusting the conversation bot, the process in accordance with several embodiments of the invention uses the gathered information to determine whether to transfer to an agent, as well as to provide helpful information about the contact to the agent before, during, or after the transfer.

As the process 400 analyzes (414) the conversations between a personalized conversation bot and a human contact, the process can also determine (416) whether to transition the conversation to a human agent, based on various characteristics of the conversation, including (but not limited to) a calculated level of interest, availability of a human agent, an emotional state of the contact (e.g., a level of frustration), progress of a conversation through a specified set of milestones, an inability of the personalized conversation bot to answer a question posed by the contact or to generate a specific response to one or more statements made by the contact, and/or the generation of an answer by a personalized conversation bot that would constitute a loop within the conversation. In some embodiments, the process calculates a level of interest based on an analysis of success rates in previously analyzed conversations, sentiment values associated with audio of the conversation, and/or keyword analysis of the conversation.

In certain embodiments, the process determines whether to transition a call based on input from another human. For example, the process in accordance with many embodiments of the invention provides a human (e.g., a manager) with a user interface that provides the manager with a view of multiple ongoing conversations between conversation bots and contacts. In some such embodiments, the user interface provides various information, such as (but not limited to) transcripts of the conversation, keyword lists, and notifications to alert the manager when a conversation is approaching a transition point (e.g., a willingness to transact, interest in a particular product, a question that cannot be handled by the conversation bot, a detected loop in the conversation, etc.). The manager can then monitor the call and determine whether to transfer the call, determine to whom to transfer the call, and transfer the call to a human agent. The manager can cause the conversation bot to then transition the call to a human agent based on their expertise, or transfer the call to the human agent associated with the conversation bot so that the human agent can seamlessly take over the conversation without interrupting the flow of the conversation. In some embodiments, the interface further allows the manager to continue to monitor the call and to provide input to the human agent (e.g., through a textual messaging interface) with various supplemental data including (but not limited to) advice, key facts, proposed strategies, and topics for discussion. When the process 400 determines (416) not to transition a call to a human agent, the process 400 continues to analyze (414) the call and customer responses.

In addition to determining whether to transfer the conversation to a human agent, the process of some embodiments further identifies (418) a handoff agent, or the human agent to whom a transition should be made. For example, in many embodiments, the process transitions a conversation to the same human agent that was identified for the initial portion of the call (e.g., the human agent associated with the personalized conversation bot selected at step 410), allowing for a smooth and seamless transition between the automated call system and a human agent, without disrupting the flow of the conversation.

In certain embodiments, the process identifies (418) a different human agent as the handoff agent. In some embodiments, the process identifies a different human agent for various reasons, including (but not limited to) the availability of the originally identified human agent, a mood of the contact, additional information captured during the conversation with the personalized conversation bot, and an expertise of the handoff agent. For example, in certain embodiments, based on a determined mood and/or sentiment of the contact, the process determines to transition to a different handoff agent who may specialize in handling contacts in various emotional states. In some embodiments, the determination of whether to transfer a conversation and to whom to transition the conversation are interrelated. For example, in certain embodiments, the determination of whether to transition depends on who is available and the expertise of the various available agents, with different human agents having different transition scores for a given contact and/or conversation.

The process according to a number of embodiments of the invention identifies the handoff agent based on a variety of factors to maximize the expected yield of the conversations. The variety of factors in accordance with some embodiments of the invention include (but are not limited to) historic rates of success (e.g., close rates) of the human agent, potential or expected value (e.g., monetary) of a contact, a timeline of the contact, and/or the particular use cases for the contact. For example, some contacts may value moving quickly, while other contacts may have a longer timeline for making a decision. Different agents may be better equipped to handle different contacts. The expected yield for the conversation may take into account such various factors to quantify a likelihood of success and/or an expected value (e.g., a monetary value) of a successful closing of the conversation.

In many embodiments, the process also generates a transition to communicate to the human contact in order to transition the conversation to the human agent. In some embodiments, the transition is specified to request additional time, while the human agent prepares to take over the call. In many embodiments, a transition process can be initiated that gracefully hands off the call to the human agent, whose voice the conversation both has been using, in a manner that is aware of the context that resulted in the handoff. For example, when the personalized conversation bot is unable to answer a question, the transition process may generate a transition phrase such as "hold on while I look something up". In this way, the transition process provides a natural break in which a human agent can seamlessly take over an ongoing conversation. During the transition and the break, the process in accordance with a number of embodiments provides the human agent with a display showing the previous conversation in text form, allowing the human agent an opportunity to quickly review the conversation and respond appropriately.

In certain embodiments, when transitioning to a different human agent, the process generates a transition to facilitate the transition to the new handoff agent. For example, the process in accordance with a number of embodiments will bring the agent on the line and provide a summary of the call and ask the human agent to take over the call. In this way, the handoff agent is introduced into the conversation, making the transition smooth for both the contact and the handoff agent.

The process 400 can transfer (420) a call to a handoff agent. In some embodiments, the process transfers the call by routing the call directly to the handoff agent. In certain embodiments, the process allows the handoff agent to join the call on mute and to then unmute the call to stop the conversation bot. Alternatively, or conjunctively, the conversation bot of certain embodiments can detect when the human agent starts talking and it could then cease responding.

In many embodiments, the conversation bot remains on the line and interjects with questions and/or comments for the contact in order to guide the conversation and to provide additional support for the human agent. In a number of embodiments, the conversation bot remains on the line, but is muted from the conversation with the contact, speaking only with the human agent to provide additional guidance and information. The additional guidance in accordance with some embodiments includes (but is not limited to) key points to focus on, as well as points of differentiation between an organization's product and a competitor's product. In addition to transferring the call, the process in accordance with several embodiments of the invention continues to monitor and analyze the call between the contact and the human agent.

In some embodiments, the system provides a user interface for the human agent to input information about the contact to a CRM database during or after the call between the human agent and the contact. For example, in a number of embodiments, the system provides a user interface that uses a set of cameras and eye-tracking technology to identify a location on a display, identify an associated field from the CRM, and analyze the conversation (or other speech input of the human agent) to generate an entry for the CRM. In some such embodiments, the system allows the human agent to enter information in a hands-off manner as the conversation continues.

Along with transferring the call, the process 400 can also provide (422) supplemental data to the human agent. The supplemental data can include previously stored information about the contact, such as (but not limited to) the contact's demographic information, prior history, geographic location, and other information gathered from the current and/or other previous calls with members of the organization. Alternatively, or conjunctively, the supplemental data can include additional information collected during the monitored call, such as (but not limited to) the contact's mood, features in which the contact expressed interest, competitors with whom the contact is familiar or associated, and topics that were discussed with the automated conversation bot.

In certain embodiments, the supplemental data includes a script, or a list of suggested topics, for continuing the call with the client to allow the human agent time to get into the flow of the ongoing conversation. The script in accordance with a variety of embodiments includes various discounts and/or remedies that can be offered to the customer. In a number of embodiments, the specific discounts and/or remedies for a particular contact are calculated based on a variety of factors including (but not limited to) a customer's mood, an expected value associated with the customer, and a cost of the offered product or service. In some embodiments, the supplemental data is gathered from a variety of sources, including (but not limited to) a CRM system, a sales lead database, social media websites, and other memory associated with the conversation bots. In many embodiments, the supplemental data is formatted and presented in a manner to highlight and emphasize different elements based on an expected relevance and importance to the particular contact.

The process in accordance with a number of embodiments of the invention determines (424) whether to transition the call to a conversation bot. In many embodiments, the determination of whether to transition the call to a conversation bot is made by the human agent. For example, in many cases the human agent can transfer the conversation to a conversation bot (whether an originating conversation bot or another conversation bot) to perform a particular function, such as (but not limited to) collecting payment information, scheduling a follow-up appointment, and to otherwise wrap up a call. In some embodiments, conversation bots are used to conclude a transaction, allowing the human agent to move on to another call while the contact's payment information (e.g., payment methods, preferred currency, payment schedules, etc.) is collected by the conversation bot. The conversation bots in accordance with a number of embodiments can also perform other functions, including (but not limited to) closing out a bill, issuing refunds, modifying the contact's service plan, and confirming various agreements and/or appointments that were discussed during the conversation. When the process determines not to transition the conversation to the conversation bot, the process ends.

When the process determines to transition the conversation to the conversation bot, the process conducts (426) the call with an automated conversation bot before the process ends. In some embodiments, the process selects the conversation bot to which to transfer the conversation based on a number of criteria including (but not limited to) a specified function to be performed by the conversation bot, an identity of the conversation bot that originated the conversation, and an identity of the human agent making the transfer. For example, in some embodiments, the process conducts the call with the same conversation bot, allowing for a continuity in the conversation so that the contact does not feel as though they are being passed around to many different individuals. In the example of this figure, a conversation is passed between a conversation bot and a human agent, but one skilled in the art will recognize that the transitions between the conversation bot and the human agent can occur in any order and may only be transferred in one direction, or may be transferred several times during the course of a conversation.

While various transition processes are described above with reference to FIG. 4, any of a variety of decision making processes can be utilized to initiate transfer of a call to a human agent as appropriate to the requirements of specific applications in accordance with various embodiments of the invention. In many embodiments, transition to a human agent that is not the human agent associated with a specific personalized conversation bot can involve continued participation of the personalized conversation bot during the handoff. During this handoff period, the personalized conversation bot is participating in a three way conversation with a human contact and a human agent. In many embodiments, specific generative models are utilized, trained based upon training data involving three way conversations, to enable the personalized conversation bot to participate in the handoff conversation in a manner that is natural and responsive to the identities of the two human speakers participating in the conversation.

Furthermore, much of the above discussion relates to the transition of conversations from personalized conversation bots to human agents to enable personalized conversation bots to screen human contacts to identify human contacts that will most benefit from interacting with a human agent. In many embodiments, automated call management systems can monitor conversations between human agents and human contacts to identify conversations that are unlikely to lead to a desired outcome and can transition the call to a personalized conversation bot to handle the pleasantries associated with wrapping up the conversation. In many embodiments, a personalized conversation bot can use separate generative models trained to screen human contacts and/or to gracefully conclude a conversation as appropriate to specific contexts. In this way, human agents are dedicated to handling the portions of the conversation that are most likely to lead to desired outcomes.

As can readily be appreciated, personalized conversation bots can be built using multiple generative models including generative models that are trained for additional conversational contexts beyond initiating a conversation/screening a contact and concluding a conversation. In a number of embodiments, the personalized conversation bot can employ a state model involving transitions between different states in which different generative models are utilized. As can readily be appreciated, the specific manner in which personalized conversation bots utilize trained models to generate conversation during dialogues with human contacts largely depends upon the requirements of a specific application.

Networked System for Managing Calls

Figure 5:
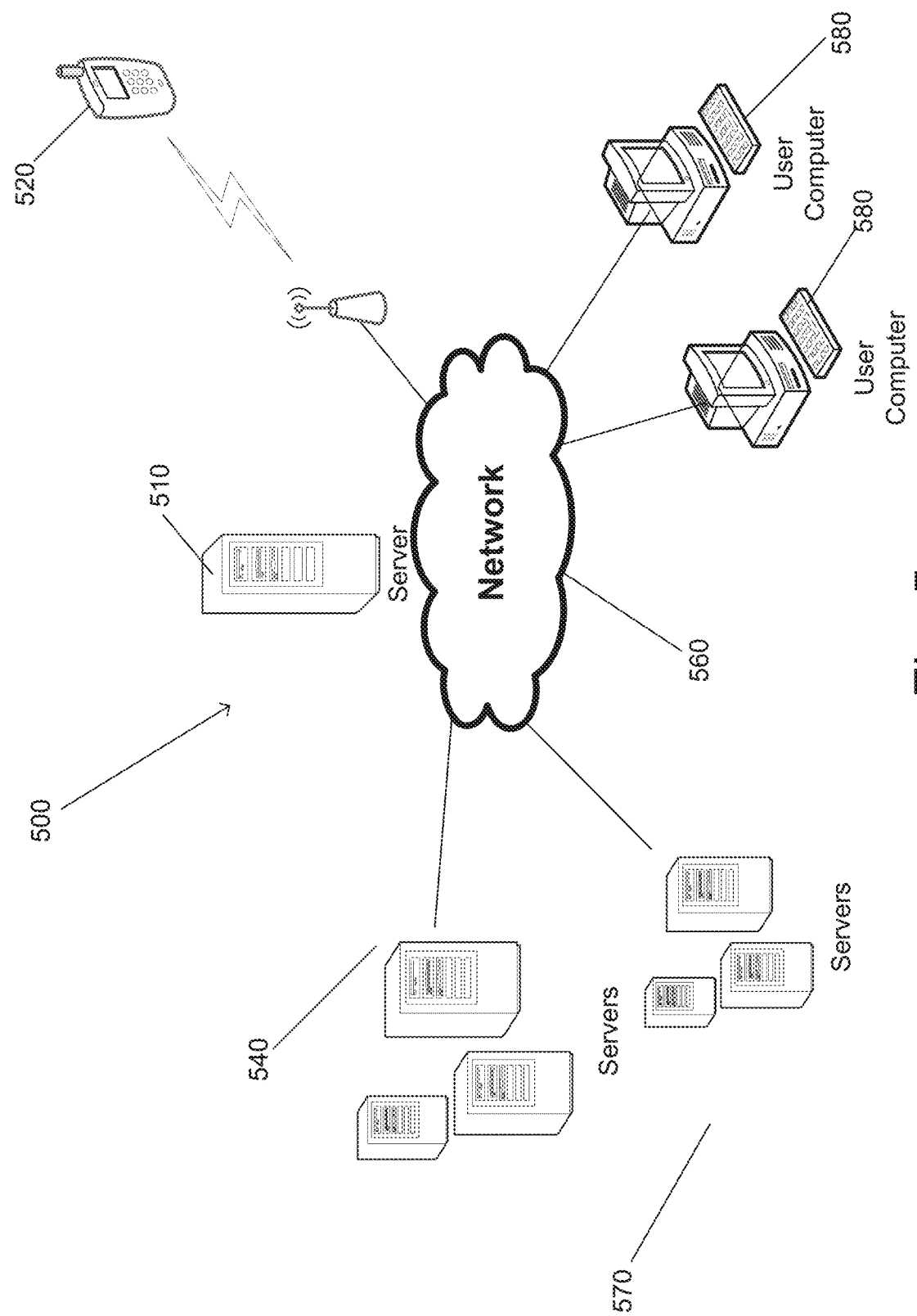
FIG. 5 illustrates a system for performing one or more processes to manage calls in accordance with various embodiments of the invention.

A system for performing one or more processes to manage calls in accordance with various embodiments of the invention is illustrated in FIG. 5. Network 500 includes a communications network 560. The communications network 560 is a network such as the Internet that allows devices connected to the network 560 to communicate with other connected devices. Server systems 510, 540, and 570 are connected to the network 560. Each of the server systems 510, 540, and 570 is a group of one or more servers communicatively connected to one another via networks that execute processes that provide cloud services to users over the network 560. For purposes of this discussion, cloud services are one or more applications that are executed by one or more server systems to provide data and/or executable applications to devices over a network. The server systems 510, 540, and 570 are shown each having three servers in the internal network. However, the server systems 510, 540 and 570 may include any number of servers and any additional number of server systems may be connected to the network 560 to provide cloud services. In accordance with various embodiments of this invention, processes for training bots and managing and conducting calls are provided by executing one or more processes on a single server system and/or a group of server systems communicating over network 560.

Users may use personal devices 580 and 520 that connect to the network 560 to perform processes for conducting calls in accordance with various embodiments of the invention. In the illustrated embodiment, the personal devices 580 are shown as desktop computers that are connected via a conventional "wired" connection to the network 560. However, the personal device 580 may be a desktop computer, a laptop computer, a smart television, an entertainment gaming console, or any other device that connects to the network 560 via a "wired" and/or "wireless" connection. The mobile device 520 connects to network 560 using a wireless connection. A wireless connection is a connection that uses Radio Frequency (RF) signals, Infrared signals, or any other form of wireless signaling to connect to the network 560. In FIG. 5, the mobile device 520 is a mobile telephone. However, mobile device 520 may be a mobile phone, Personal Digital Assistant (PDA), a tablet, a smartphone, or any other type of device that connects to network 560 via a wireless connection without departing from this invention. In accordance with some embodiments of the invention, processes for managing calls and/or for collecting data for managing the calls are performed by the user device. In many embodiments, an application being executed by the user device may capture or obtain images including a face image and transmit the captured images to a server system that performs additional processing based upon the received images. Although references are made to images throughout this application, one skilled in the art will recognize that processes described in this application can clearly be applied to video (or video frames) without departing from this invention.

Although the description above contains many specificities, these should not be construed as limiting the scope of the invention but as merely providing illustrations of some of the presently preferred embodiments of the invention. Various other embodiments are possible within its scope. Many of the discussions above are related to verbal communications, but one skilled in the art would recognize that many of the techniques described above would apply to other forms of communication, such as (but not limited to) gestures and/or text, as well. For example, in some embodiments the conversations are text-based conversations, where a personalized conversation bot analyzes the text-based conversations with the contacts, and mimics a text-based conversation style of a human agent, including (but not limited) grammatical styles, message length, typing speed, and/or vocabulary. Alternatively, or conjunctively, the text-based personalized conversation bot could collect previously typed responses from the human agent and use them directly in conversations with contacts. Similarly, the determination of whether to transition and how to transition can also be performed according to processes similar to those described above. Accordingly, the scope of the invention should be determined not by the embodiments illustrated, but by the appended claims and their equivalents.

What is claimed:

1. A method for managing a call between a contact, a conversation bot, and a human agent, the method comprising:
    selecting a conversation bot associated with a particular human agent from a plurality of conversation bots that are each associated with a different human agent using an automated call management system, wherein each conversation bot is a computer model trained using conversation data including specific conversation data recorded during conversations conducted by the particular human agent with which it is associated;
    connecting an audio call with a human contact using the automated call management system;
    generating audio during the call, where the audio is generated based upon a voice of the particular human agent using the automated call management system;
    recording speech of the human contact and converting the recorded speech to text to create a text transcript of the call using the automated call management system;
    determining that a transition criterion is satisfied based upon the text transcript of the call;
    selecting a selected human agent from amongst a plurality of available human agents using the automated call management system;
    when the transition criterion is satisfied, enabling a selected human agent to participate on the call using the automated call management system; and
    continuing the call between the selected human agent and the human contact.

2. The method of claim 1, wherein the selected human agent is the specific human agent associated with the conversation bot.

3. The method of claim 1, wherein the selected human agent is a different human agent to the specific human agent associated with the conversation bot.

4. The method of claim 1 further comprising displaying a set of supplemental data to the selected human agent via a display, wherein the supplemental data comprises information gathered during the call.

5. The method of claim 4, wherein the supplemental data further comprises at least a portion of the text transcript.

6. The method of claim 1, wherein determining that a transition criterion is satisfied comprises determining whether a conversation is likely to enter a conversation loop.

7. The method of claim 1, wherein determining that a transition criterion is satisfied comprises calculating a level of interest and transitioning the call to the handoff agent when the level of interest exceeds a threshold level.

8. The method of claim 1, wherein selecting the conversation bot comprises selecting the conversation bot based on at least one characteristic of the contact to be called.

9. The method of claim 1, wherein connecting a selected human agent into the call further comprises:
    generating a transitional conversation portion using the conversation bot; and
    generating audio of the transitional conversation portion based upon the voice of the particular human agent.

10. The method of claim 1, wherein enabling a selected human agent to participate on the call when a transition criterion is satisfied further comprises:
    connecting the selected human agent into the call while audio is generated at the direction of the conversation bot speaks as it converses with the human contact;
    wherein the transition criterion is satisfied when the selected human agent provides an input to the automated call management system to enable the selected human agent to participate on the call.

11. The method of claim 1, wherein audio is generated based upon a voice of the particular human agent using at least one technique selected from the group consisting of:
    playing back an audio recording of the particular human agent associated with the conversation bot; and
    synthesizing speech using a speech model based upon the voice of the particular human agent.

12. The method of claim 1, further comprising:
    recording the outcome of the call; and retraining the conversation bots based upon recorded call outcomes.

13. A non-transitory machine readable medium including instructions that, when executed by a set of one or more processing units, causes the set of processing units to manage a call between a contact, a conversation bot, and a human agent by performing the following operations:
   selecting a conversation bot associated with a particular human agent from a plurality of conversation bots that are each associated with a different human agent using an automated call management system, wherein each conversation bot is a computer model trained using conversation data including specific conversation data recorded during conversations conducted by the particular human agent with which it is associated;
   connecting an audio call with a human contact using the automated call management system;
   generating audio during the call, where the audio is generated based upon a voice of the particular human agent using the automated call management system;
   recording speech of the human contact and converting the recorded speech to text to create a text transcript of the call using the automated call management system;
   determining that a transition criterion is satisfied based upon the text transcript of the call;
   selecting a selected human agent from amongst a plurality of available human agents using the automated call management system;
   when the transition criterion is satisfied, enabling a selected human agent to participate on the call using the automated call management system; and
   continuing the call between the selected human agent and the human contact.

14. The non-transitory machine readable medium of claim 13, wherein the selected human agent is the specific human agent associated with the conversation bot.

15. The non-transitory machine readable medium of claim 13, wherein the selected human agent is a different human agent to the specific human agent associated with the conversation bot.

16. The non-transitory machine readable medium of claim 13 further comprising instructions for displaying a set of supplemental data to the selected human agent via a display, wherein the supplemental data comprises information gathered during the call.

17. The method of claim 16, wherein the supplemental data further comprises at least a portion of the text transcript.

18. The non-transitory machine readable medium of claim 13, wherein determining that a transition criterion is satisfied comprises determining whether a conversation is likely to enter a conversation loop.

19. The non-transitory machine readable medium of claim 13, wherein determining that a transition criterion is satisfied comprises calculating a level of interest and transitioning the call to the handoff agent when the level of interest exceeds a threshold level.

20. The non-transitory machine readable medium of claim 13, wherein selecting the conversation bot comprises selecting the conversation bot based on at least one characteristic of the contact to be called.

* * * * *